Oct. 27, 1925.
G. D. SUNDSTRAND
1,559,296
REAR TOOL
Filed April 30, 1919
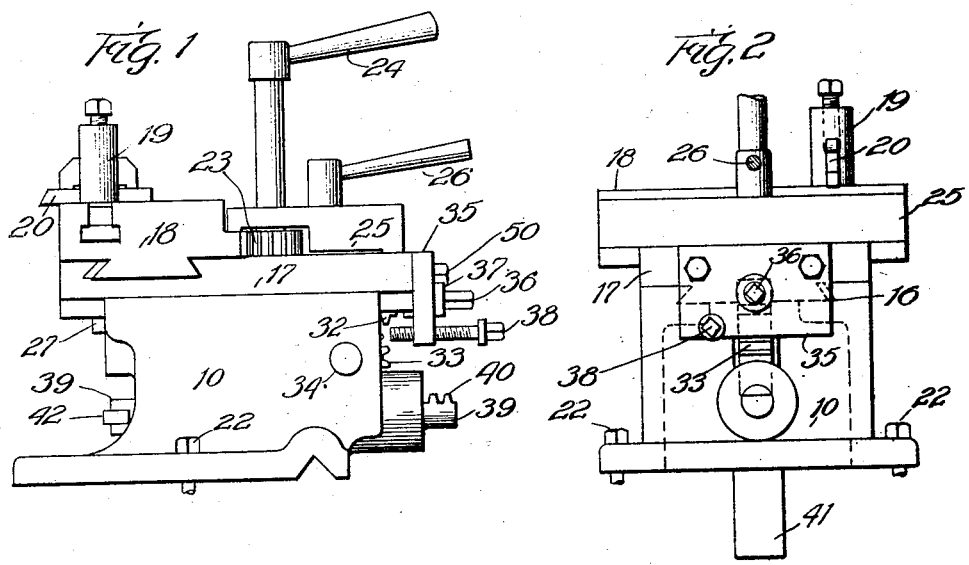
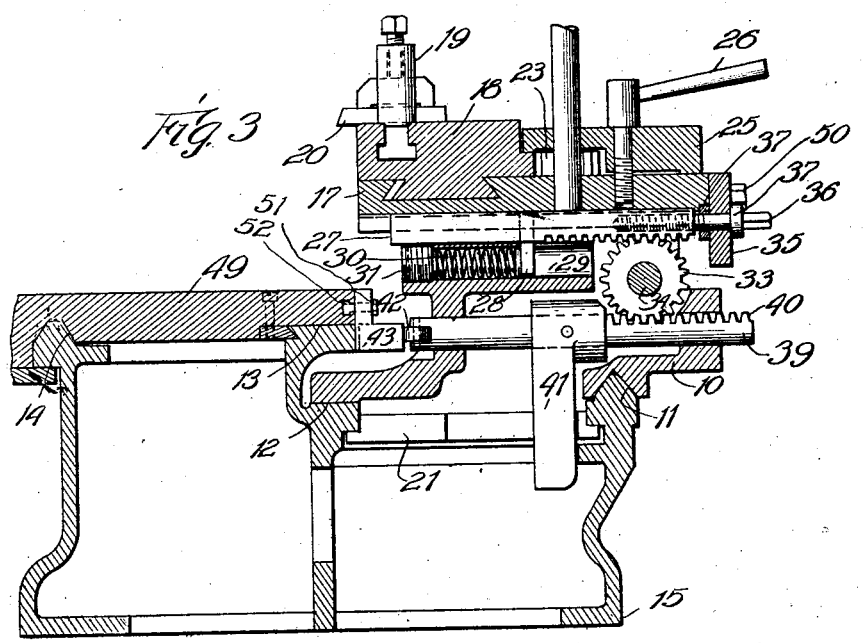

Patented Oct. 27, 1925.

1,559,296

UNITED STATES PATENT OFFICE.

GUSTAF DAVID SUNDSTRAND, OF ROCKFORD, ILLINOIS, ASSIGNOR TO ROCKFORD TOOL COMPANY, OF ROCKFORD, ILLINOIS, A CORPORATION OF ILLINOIS.

REAR TOOL.

Application filed April 30, 1919. Serial No. 293,868.

*To all whom it may concern:*

Be it known that I, GUSTAF DAVID SUNDSTRAND, citizen of the United States, residing at Rockford, in the county of Winnebago and State of Illinois, have invented certain new and useful Improvements in Rear Tools, of which the following is a specification.

My invention relates to lathes, and more especially to an improved rear tool for lathes, especially adapted for automatic actuation.

One of the objects of my invention is to provide for the automatic operation of the rear tool by motion of the front tool carriage simultaneously with the operation of the front tool.

Another object is to provide for small adjustments of the rear tool both along the lathe bed and across it, to compensate for variations in the stock, wear of the tool, etc., quickly and without disturbing the adjustment of the automatic connections.

Another object is to provide in addition to the automatic actuating means, manual means for operating the rear tool at any time.

Still another object is to provide a particularly strong power transmission for the feed of the rear tool, capable of withstanding heavy shocks and stresses.

Other objects and advantages of the invention will be apparent as the description proceeds.

In the accompanying drawings—

Figure 1 is an end view,

Fig. 2 is a rear side elevation of the tool,

Fig. 3 is a section of a lathe bed and the tool mounted thereon, and

Fig. 4 is a detail view of one of the cams used to guide the tool.

In the embodiment of the invention selected for illustration, 10 is the main frame of my improved rear tool. It is mounted for longitudinal movement along ways 11 and 12 of the lathe bed 15 and its upper part terminates in a guideway 16 in which is mounted a transverse slide member 17 carrying a longitudinally slidable tool support 18 on which is mounted any suitable tool holder 19 holding the tool 20.

The main frame 10 may be clamped in any desired position by any suitable means, as, for example, a plate 21 engaging the under side of ways 11 and 12 and forced into binding engagement therewith by suitable bolts 22. A second longitudinal adjustment of the tool 20 may be obtained by sliding the tool support 18 on the transverse slide 17. The means herein shown for making this adjustment comprise a pinion 23 engaging a rack on the rear side of the support 18 and rotated by means of a handle 24. A suitable clamp 25 locked by handle 26 may be used to hold the tool support 18 in adjusted position.

The slide member 17 is adapted to be fed toward the center line of the lathe either automatically or manually. A rack bar 27 having a rack 32 projects from the bottom of the transverse slide 17 and meshes with a pinion 33 freely rotatable on a shaft 34 mounted in the main frame 10.

The rack bar 27 is slidably mounted in a groove in the bottom of slide 17. A downwardly projecting apron 35 suitably attached, as by screws 50 at the rear end of the slide carries a rotatably mounted threaded member 36 entering a threaded aperture in the rack bar and restrained from endwise movement by collars 37. To limit the forward motion of the transverse slide 17 a stop pin 38 may be adjustably mounted on the apron 35. As shown, the stop pin is threaded through the apron and abuts against the main frame 10 to prevent movement toward the front beyond any desired point.

A spring tension pin 28 projecting from the bottom of the rack bar 27 reciprocates in a tubular aperture 29 in the main frame 10, said aperture being suitably slotted to allow the pin the desired amount of travel. A compression spring 30 lies partly within the unslotted portion of the aperture 29 and presses the pin to the rear, or away from the center line of the machine. A plug 31 in the threaded end of the aperture 29 permits easy removal of the spring and also adjustment of its tension.

A transversely slidable transmission member 39 is mounted in the main frame 10. This member has a rack 40 along the upper side of its rearmost portion meshing with the pinion 33, a downwardly projecting bracket 41 at its central portion, and a cam roller 42 at its front end.

The front tool carriage 49 is mounted on ways 13 and 14 formed on the bed 15, and may be equipped with the usual tools and adjustments, not shown. Any suitable means for feeding the front carriage 49 along the ways 13 and 14 may be provided, such, for instance, as that described and illustrated in detail in my co-pending application Serial No. 212,393, filed January 18, 1918. On the rear edge of the front tool carriage a cam such as 43 may be adjustably clamped in any desired manner as, for instance, by bolts 51 having square heads slidable in the T slot 52.

The cam illustrated has a vertical flange 44 engaging the rear face of the front tool carriage 43 and a horizontally projecting cam flange 45.

It will be seen upon reference to Fig. 3 that ways 13 and 14 are at a higher level than ways 11 and 12 and also that way 13 is directly over way 12. Among other advantages, this arrangement results in a convenient location for the cam 43 where its horizontally projecting flange 45 engages with the cam roller 42. The horizontal cam flange shown has three sections, a section 46 parallel with the direction of motion of the cam, a second section 47 inclined thereto, and a third section 48 parallel to the first.

It will be seen that as the front tool carriage moves toward the head stock and past the stationary frame of the rear tool, the cam roller 42 will be maintained in engagement with the cam by the pressure of the spring 30. The first parallel section therefore, represents a space through which the front tool carriage will move without producing any motion of the rear tool. While the inclined section passes by the cam roller, the roller and the main transmission member 39 will be forced back, rotating the pinion 33 and forcing the slide 17 and the cutting tool 20 forward against the material. When the third section is reached, motion of the rear tool ceases. During all three of these periods the front tool may continue uniformly machining a smooth cylinder from the material on the lathe.

The above series of steps defines a simple cutting off or shoulder-forming operation by the rear tool 20. It is obvious that the timing of this operation with respect to the movement of the front tool can be readily adjusted by shifting the cam, and that any number of cams may be designed to perform similar operations at varying rates of speed. By the use of rear tools of special design a large variety of variously shaped articles may be produced.

With a given cam installed the limits of the motion produced by it may also be readily adjusted in a transverse direction by adjustment of the rack 32 with respect to the slide 17 without disturbing the cam. The third section 48 of the cam 43 is always made long enough to remain in contact with roller 42 while the operation the machine is performing is being entirely completed.

Any suitable hand-feeding mechanism, such, for instance, as that described and illustrated in my co-pending application, Serial No. 212,393, hereinabove referred to, may have engagement with the downwardly projecting bracket 41 for manual operation of the rear tool at any time more particularly when a cam 43 is not in use. The manual control is also useful in making a mark on the stock from which to measure for preliminary adjustments of the front tool before starting a cut, whether cam 43 is being used or not. Stop pin 38 is intended for use primarily when cam 43 is not used to secure uniformity in the work when the tool is manually operated.

While the embodiment of my invention above described is particularly efficient in handling large numbers of small parts requiring a surfacing cut to be followed by the cutting of grooves or shoulders, or the complete cutting off of a piece of stock, it is obvious that the mechanisms disclosed are useful in other and more general applications, with or without modifications such as would naturally be suggested by the nature of the work to be done.

I claim as my invention:

1. In a lathe, in combination, a rear tool carriage, a rear tool on said carriage, a front tool carriage movable past said rear tool carriage, a member movably mounted in said rear tool carriage, a member on said front tool carriage engaging said movably mounted member, an operative connection between said rear tool and said movably mounted member, whereby motion of said front carriage past said rear carriage will automatically actuate said rear tool, and additional independent means for adjusting the position of said rear tool both longitudinally and transversely with respect to its carriage.

2. In a lathe, in combination, a front tool carriage, a cam on said front tool carriage, a rear carriage adapted to be clamped in adjusted longitudinal position on the lathe bed, a rear tool on said rear carriage and transversely slidable thereon, a movable member in said rear carriage adapted to engage the face of said cam, an operative connection between said cam-engaging member and said tool, resilient means maintaining said cam-engaging member in contact with said cam, and additional independent means for adjusting the position of said rear tool both longitudinally and transversely with respect to its carriage.

3. In a lathe, in combination, a cutting tool on the rear side of the lathe adapted to operate on the rear side of the material, a frame longitudinally slidable on the lathe bed carrying said tool, means for clamping said frame in adjusted position on said lathe bed, a second quickly releasable means for adjusting said tool longitudinally, and means carried by said frame for feeding said tool transversely.

4. In a lathe, in combination, a tool carriage, a transversely slidable member on said tool carriage, a transversely slidable transmission member in said carriage, a rotatable member contacting with each of said transversely slidable members and adapted to transmit motion between them, a tool on one of said transversely slidable members, resilient means acting on one of said members to press said tool in a given direction, and manually actuated means for positively actuating said members in either direction.

5. In a lathe, in combination, a tool carriage, a transversely slidable member on said tool carriage, a transversely slidable transmission member in said carriage, a rotatable member contacting with each of said transversely slidable members and adapted to transmit motion between them, a tool on one of said transversely slidable members, resilient means acting on one of said members to press said tool in a given direction, contact means positively actuating said members against the force of said spring, and additional independent means for adjusting the longitudinal and transverse positions of the tool on the slidable member which carries it.

6. A lathe having, in combination, a front tool carriage, a rear tool, and means for automatically feeding said rear tool through a predetermined path during a predetermined motion of said front tool, and independent manually operable means for feeding said rear tool.

7. In a lathe, in combination, a front tool carriage, a rear tool carriage, a slidable tool on said rear tool carriage, an automatic connection between said front tool carriage and said rear tool including cam means for moving said rear tool from a definite position on the rear carriage to another definite position on the rear carriage during a predetermined portion of the movement of the front tool carriage, and a cross feed screw interpolated in the connection between the front tool carriage and the rear tool for precisely adjusting the position of the rear tool without disturbing the automatic connection.

8. A lathe having, in combination, a plurality of sets of ways, a carriage on one set of ways, means for clamping said carriage in longitudinally adjusted position, a tool on said carriage slidable on a horizontal axis, a cross feed screw for sliding said tool, a front tool carriage slidable past said first mentioned carriage, and an automatic connection for actuating said rear tool from said front tool carriage.

In testimony whereof I have hereunto set my hand.

GUSTAF DAVID SUNDSTRAND.